United States Patent
Park et al.

(10) Patent No.: US 11,955,123 B2
(45) Date of Patent: Apr. 9, 2024

(54) SPEECH RECOGNITION SYSTEM AND METHOD OF CONTROLLING THE SAME

(71) Applicants: Hyundai Motor Company, Seoul (KR); Kia Corporation, Seoul (KR)

(72) Inventors: Minjae Park, Gyeonggi-do (KR); Sungwang Kim, Seoul (KR); Byeong Yeol Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 331 days.

(21) Appl. No.: 17/539,943

(22) Filed: Dec. 1, 2021

(65) Prior Publication Data

US 2022/0301560 A1    Sep. 22, 2022

(30) Foreign Application Priority Data

Mar. 16, 2021   (KR) .................. 10-2021-0034171

(51) Int. Cl.
| | |
|---|---|
| *G10L 15/22* | (2006.01) |
| *G10L 13/02* | (2013.01) |
| *G10L 15/08* | (2006.01) |
| *G10L 15/18* | (2013.01) |
| *G10L 15/28* | (2013.01) |

(52) U.S. Cl.
CPC .............. *G10L 15/22* (2013.01); *G10L 13/02* (2013.01); *G10L 15/1815* (2013.01); *G10L 15/28* (2013.01); *G10L 2015/088* (2013.01); *G10L 2015/228* (2013.01)

(58) Field of Classification Search
CPC ..... G10L 15/22; G10L 13/02; G10L 15/1815; G10L 15/28; G10L 13/033; G10L 15/32; G10L 15/04; G10L 15/26; G10L 15/1822; G10L 17/24; G10L 13/027; G10L 15/08; G10L 21/00; G10L 2015/088; G10L 2015/228; G10L 2015/223

See application file for complete search history.

(56) References Cited

U.S. PATENT DOCUMENTS

| | | | | |
|---|---|---|---|---|
| 2014/0195244 A1* | 7/2014 | Cha | ........................ | H04N 21/233 704/270.1 |
| 2019/0378515 A1* | 12/2019 | Kim | ........................ | G10L 17/22 |

FOREIGN PATENT DOCUMENTS

| | | | |
|---|---|---|---|
| KR | 101560798 B1 * | 10/2015 | |
| KR | 101560798 B1 | 10/2015 | |
| KR | 20170047634 A * | 5/2017 | |
| KR | 101755648 B1 | 7/2017 | |

* cited by examiner

*Primary Examiner* — Yogeshkumar Patel
(74) *Attorney, Agent, or Firm* — Fox Rothschild LLP

(57) ABSTRACT

A speech recognition system includes: a speech processor configured to identify an intention of a user included in an utterance of the user; a controller configured to identify whether a function corresponding to the intention of the utterance is performable, and if the function corresponding to the intention of the utterance is not performable, generate spoken text for requesting an other speech recognition system to perform the function corresponding to the intention of the user; and an utterance generator configured to convert the spoken text into a speech signal of an inaudible frequency band.

19 Claims, 13 Drawing Sheets

FIG. 5

| | WAKE-UP WORD | PERFORMABLE FUNCTIONS | BT CONNECTION STATUS | FUNCTION EXECUTION HISTORY |
|---|---|---|---|---|
| FIRST SPEECH RECOGNITION SYSTEM | ○ ○ | MUSIC PLAYBACK<br>NAVIGATION<br>PHONE CALL<br>INFORMATION SEARCH<br>⋮ | ○ | - |
| SECOND SPEECH RECOGNITION SYSTEM | △ △ | INFORMATION SEARCH<br>MESSAGE SENDING<br>PHONE CALL<br>SCHEDULE MANAGEMENT<br>MUSIC PLAYBACK<br>⋮ | × | INFORMATION SEARCH<br>MESSAGE SENDING<br>SCHEDULE MANAGEMENT |
| THIRD SPEECH RECOGNITION SYSTEM | □ □ | INFORMATION SEARCH<br>SCHEDULE MANAGEMENT<br>PHONE CALL<br>⋮ | ○ | PHONE CALL<br>INFORMATION SEARCH |

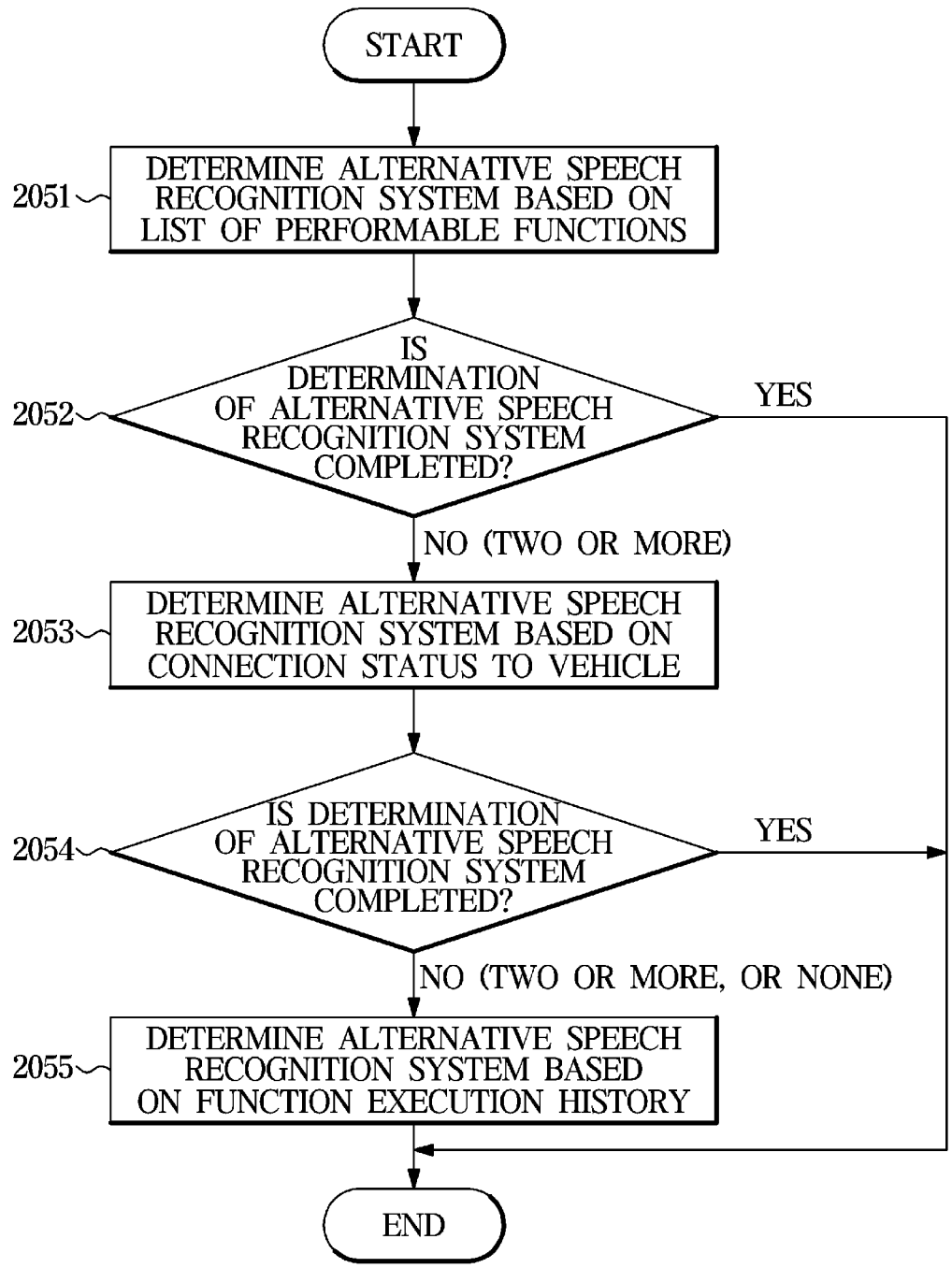

SPEECH RECOGNITION SYSTEM AND METHOD OF CONTROLLING THE SAME

CROSS-REFERENCE TO RELATED APPLICATION

This application claims under 35 U.S.C. § 119 the benefit of Korean Patent Application No. 10-2021-0034171, filed on Mar. 16, 2021 in the Korean Intellectual Property Office, the entire contents of which are incorporated herein by reference.

BACKGROUND

1. Technical Field

The disclosure relates to a speech recognition system for providing a service corresponding to an utterance of a user, and a method of controlling the same.

2. Description of the Related Art

A speech recognition system is a system capable of identifying an intention of a user included in an utterance of the user and providing a service corresponding to the identified intention of the user.

The speech recognition system is associated with a specific device to perform control of the device according to an intention of a user, or provide specific information according to the intention of the user.

Such a speech recognition system has a different function depending on a company that provides the speech recognition system, and even if a plurality of speech recognition systems provide the same function, different users may prefer different speech recognition systems.

However, because each speech recognition system uses a different "wake-up" word, users need to make an utterance using a suitable wake-up word depending on each function desired by the user, which may decrease the usability of the speech recognition system.

SUMMARY

The present disclosure provides a speech recognition system capable of, when a function corresponding to an utterance of a user is not performable by itself, generating an utterance for requesting the function from another speech recognition system capable of performing the function and outputting the utterance, so that usability may be improved, and a method of controlling the same.

The present disclosure provides a speech recognition system and a method of controlling the same, in which with regard to generating an utterance for requesting a function from another speech recognition system, an audio signal of an inaudible frequency band corresponding to the utterance is used so as to maintain a comfortable use environment.

As provided herein, the terms "another," "an other," or "at least one other" refer to one or more, in particular, in the context of other speech recognition system(s) that may be capable of performing a function according to an intention of a user, and for which appropriate spoken text may be generated.

Additional aspects of the disclosure will be set forth in part in the description which follows and, in part, will be obvious from the description, or may be learned by practice of the disclosure.

According to an aspect of the disclosure, there is provided a speech recognition system including: a speech processor configured to identify an intention of a user included in an utterance of the user; a controller configured to identify whether a function corresponding to the intention of the utterance is performable, and if the function corresponding to the intention of the utterance is not performable, generate spoken text for requesting an other speech recognition system to perform the function corresponding to the intention of the user; and an utterance generator configured to convert the spoken text into a speech signal of an inaudible frequency band.

The controller may be configured to register the other speech recognition system in advance, and if the function corresponding to the intention of the user is not performable, generate spoken text for requesting the registered other speech recognition system to perform the function corresponding to the intention of the user.

The controller may be configured to determine an other speech recognition system to perform the function corresponding to the intention of the user, and generate spoken text for requesting the determined other speech recognition system to perform the function corresponding to the intention of the user.

The controller may be configured to store information about a respective function performable by each of the other speech recognition system in advance, and based on the stored information, determine the other speech recognition system to perform the function corresponding to the intention of the user.

The controller may be configured to, if the other speech recognition system has a history of having performed the function corresponding to the intention of the user, determine the other speech recognition system to perform the function corresponding to the intention of the user.

The controller may be configured to, if an other speech recognition system connected to a user terminal of the speech recognition system exists, generate spoken text for requesting the connected other speech recognition system to perform the function corresponding to the intention of the user.

The controller may be configured to generate the spoken text by including a wake-up word corresponding to the other speech recognition system.

The controller may be configured to generate the spoken text by combining the utterance of the user with the wake-up word.

The controller may be configured to store sample sentences for each function of the other speech recognition system, and generate the spoken text based on the intention of the user and the sample sentences The speech recognition system may further include a communicator configured to receive the utterance of the user from a user terminal, and transmit the audio signal of the inaudible frequency band to the user terminal.

The controller may be configured to, if the registered other speech recognition system is provided in plural, sequentially transmit a plurality of audio signals of inaudible frequency bands respectively corresponding to the plurality of different speech recognition systems, to the user terminal.

The controller may be configured to, if a response to an audio signal of an inaudible frequency band outputted through the user terminal is not received, transmit an audio signal of an inaudible frequency band of a next order to the user terminal.

According to an aspect of the disclosure, there is provided a method of controlling a speech recognition system, the method including: identifying an intention of a user included in an utterance of the user; identifying whether a function corresponding to the intention of the utterance is performable; generating, if the function corresponding to the intention of the utterance is not performable, spoken text for requesting an other speech recognition system to perform the function corresponding to the intention of the user; and converting the spoken text into a speech signal of an inaudible frequency band.

The method may further include registering the other speech recognition system in advance, and wherein the generating of the spoken text may include, if the function corresponding to the intention of the user is not performable, generating spoken text for requesting the registered other speech recognition system to perform the function corresponding to the intention of the user.

The generating of the spoken text may include: determining the other speech recognition system to perform the function corresponding to the intention of the user among a plurality of other speech recognition systems; and generating the spoken text for requesting the determined other speech recognition system to perform the function corresponding to the intention of the user.

The method may further include storing information about a respective function performable by each of the other speech recognition system in advance, and wherein the generating of the spoken text may include, based on the stored information, determining the other speech recognition system to perform the function corresponding to the intention of the user.

The generating of the spoken text may include, if a history of an other speech recognition system having performed the function corresponding to the intention of the user exists, determining the other speech recognition system having the history as an other speech recognition system to perform the function corresponding to the intention of the user.

The generating of the spoken text may include, if an other speech recognition system connected to a user terminal of the speech recognition system exists, generating spoken text for requesting the connected other speech recognition system to perform the function corresponding to the intention of the user.

The generating of the spoken text may include generating the spoken text by including a wake-up word corresponding to the other speech recognition system.

The generating of the spoken text may include generating the spoken text by combining the utterance of the user with the wake-up word.

The method may further include storing a sample sentences for the function of the other speech recognition system, and the generating of the spoken text includes generating the spoken text based on a sample sentence for the function corresponding to intention of the user among the stored sample sentences.

The method may further include receiving the utterance of the user from a user terminal and transmitting the audio signal of the inaudible frequency band to the user terminal.

The transmitting of the audio signal of the inaudible frequency band to the user terminal may include, if the registered other speech recognition system is provided in plural, sequentially transmitting a plurality of audio signals of inaudible frequency bands respectively corresponding to the plurality of different speech recognition systems to the user terminal.

The transmitting of the audio signal of the inaudible frequency band to the user terminal may include, if a response to an audio signal of an inaudible frequency band outputted through the user terminal is not received, transmitting an audio signal of an inaudible frequency band of a next order to the user terminal.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 5 is a table showing an example of information about other speech recognition systems stored in a speech recognition system according to an embodiment;

FIG. 13 is a flowchart showing a method of controlling a speech recognition system according to an embodiment, which shows a method of determining another speech recognition system to perform a function corresponding to an intention of a user.

DETAILED DESCRIPTION

Figure 1:
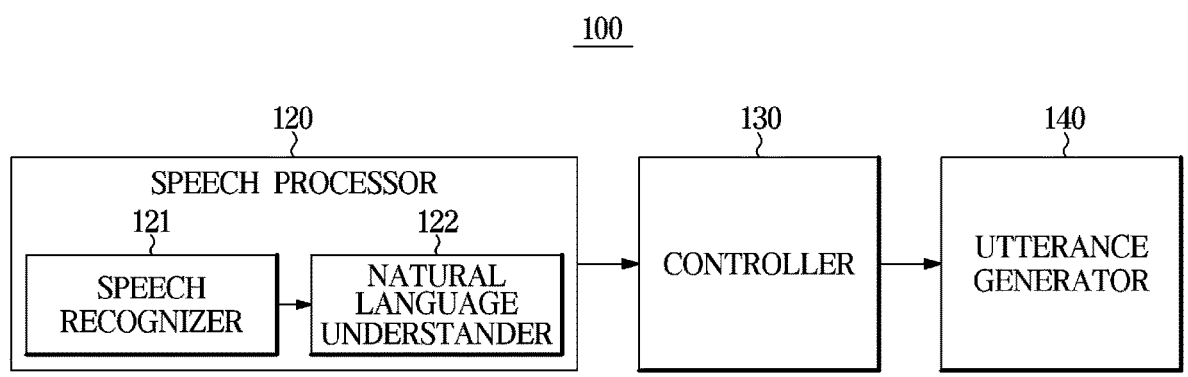
FIG. 1 is a control block diagram illustrating a speech recognition system according to an embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. The terminology used herein is for the purpose of describing particular embodiments only and is not intended to be limiting of the disclosure.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising"

will be understood to imply the inclusion of stated elements but not the exclusion of any other elements, in addition, the terms "unit", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, contract or the like. Examples of computer readable media include, but are not limited to, ROM, RAM, compact disc (CD)-ROMs, magnetic tapes, floppy disks, flash drives, smart cards and optical age devices. The computer readable medium can also be distributed in network coupled computer systems so that the computer readable media is stored and executed in a distributed fashion, e.g., by a telematics server or a Controller Area Network (CAN).

The embodiments set forth herein and illustrated in the configuration of the disclosure are only preferred embodiments, so it should be understood that they may be replaced with various equivalents and modifications at the time of the disclosure.

The terms, such as "~part", "~device", "~block", "~member", "~module", and the like may refer to a unit for processing at least one function or act. For example, the terms may refer to at least process processed by at least one hardware, such as field-programmable gate array (FPGA)/application specific integrated circuit (ASIC), software stored in memories, or processors.

Although the terms "first," "second," "A," "B," etc. may be used to describe various components, the terms do not limit the corresponding components, but are used only for the purpose of distinguishing one component from another component.

Reference numerals used for method steps are just used for convenience of explanation, but not to limit an order of the steps. Thus, unless the context clearly dictates otherwise, the written order may be practiced otherwise.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

Hereinafter, an embodiment of a dialogue system, a vehicle, and a control method thereof according to an aspect will be described in detail with reference to the accompanying drawings.

FIG. 1 is a control block diagram illustrating a speech recognition system according to an embodiment.

Referring to FIG. 1, a speech recognition system 100 according to an embodiment includes a speech processor 120 configured to identify an intention of a user included in an utterance of the user, a controller 130 configured to identify whether a function corresponding to the intention of the utterance is performable, and if the function corresponding to the intention of the utterance is not performable, generate spoken text for requesting at least one other speech recognition system to perform the function corresponding to the intention of the user, and an utterance generator 140 configured to convert the spoken text into a speech signal of an inaudible frequency band.

The speech recognition system 100 may be used in connection with a user terminal provided with a user interface, that is, an input/output device. For example, when the speech recognition system 100 is provided in a server, the speech recognition system 100 provided in the server may be connected to a user terminal through communication. Alternatively, the speech recognition system 100 may be provided in a user terminal.

A user terminal may be a mobile device, such as a smart phone, a tablet personal computer (PC), a smart watch, smart glasses, etc., or may be a home appliance, such as a refrigerator, a television (TV), an air conditioner, a washing machine, etc., or may be a speaker (an artificial intelligence (AI) speaker) that mainly performs input/output functions, or may be a vehicle. The user terminal is not limited on the type as long as it can be wirelessly connected to the speech recognition system 100 and provide a user with an input/output device.

An utterance of the user may be input through a microphone 10 (see FIG. 3) provided in the user terminal, and the inputted utterance of the user may be transmitted to the speech processor 120 in the form of an audio signal.

The speech processor 120 may include a speech recognizer 121 that converts an utterance of a user into spoken text, and a natural language understander 122 that identifies an intention of a user corresponding to the spoken text.

The speech recognizer 121 may be implemented as a speech to text (STT) engine and may apply a speech recognition algorithm to an utterance of a user to convert the utterance into text For example, the speech recognizer 121 may use feature vector extraction technologies, such as Cepstrum, Linear Predictive Coefficient (LPC), Mel Frequency Cepstral Coefficient (MFCC) or Filter Bank Energy, to extract a feature vector from an utterance of a user.

Then, the extracted feature vector is compared with a trained reference pattern to obtain a recognition result. To this end, an acoustic model that models and compares signal characteristics of a speech or a language model that models a linguistic order relationship of words or syllables corresponding to a recognized vocabulary may be used.

In addition, the speech recognizer 121 may also convert an utterance of a user into spoken text based on a learning using a machine learning or deep learning. In the present embodiment, there is no restriction on a method of converting an utterance of a user into spoken text by the speech recognizer 121, and the speech recognizer 121 may apply various speech recognition technologies in addition to the above-described method to convert an utterance of user into spoken text.

The natural language understander 122 may employ natural language understanding (NLU) technology to identify an intention of a user contained in spoken text. Accordingly, the natural language understander 122 may include a NLU engine for identifying an intention of a user by applying NLU technology to an input sentence.

For example, the natural language understander 122 may recognize an entity name from spoken text. An entity name is a proper noun, such as a person's name, a place name, an organization name, a time, a date, money, etc., and the recognition of an entity name is a task of identifying an entity name in a sentence and determining the type of the identified entity name. Through the recognition of the entity name, an important keyword may be extracted from a sentence and the meaning of the sentence may be grasped.

In addition, the natural language understander 122 may determine a domain from the spoken text. The domain may allow the subject of the utterance of the user to be identified.

For example, domains representing various subjects, such as home appliance control, schedule management, information provision of a weather or traffic condition, texting, phone call, vehicle control, etc., may be determined based on the spoken text.

In addition, the natural language understander 122 may analyze a speech act of the spoken text. The analysis of a speech act is a task of analyzing the intention of the utterance, and is provided to identify the intention of the utterance, such as whether the user asks a question, makes a request, responds, or expresses a simple sentiment.

The natural language understander 122 may identify an intent and an entity required to perform a function corresponding to the intent, based on information, such as a domain, an entity name, a speech act, etc., extracted from the spoken text.

For example, when the spoken text is "Turn on the air conditioner", the domain may be [vehicle control], the intent may be [turn on, air conditioner], and the entity required to perform control corresponding to the intent may be [temperature, air volume].

Alternatively, when the spoken text is "Send a message", the domain may be [message transmission/reception], the intent may be [send, message], and the entity required to perform control corresponding to the intent may be [recipient, content].

The intent may be determined by an action and a target. In the above example, the action may be "turned on", and the target may be "air conditioner". However, the terms may vary between different speech recognition systems, and thus a term "operator" instead of "action" and a term "object" instead of "target" may be used. Regardless of the terms used, anything may be included in the scope of the action and the target according to the embodiment as long as they can determine or define an intent corresponding to an utterance of a user. An intention of a user may be defined by values of a domain, an intent, and an entity extracted from spoken text.

Meanwhile, an operation of identifying the user's intention by the speech recognition system 100 according to the above-described process may be performed when a predetermined wake-up word is uttered by the user. Therefore, the speech recognition system 100 does not analyze all the utterances of the user to determine the user's intention, but when the user expresses his/her intention to use the speech recognition system 100 by uttering a predetermined wake-up word, analyzes the utterance of the user to determine the user's intention.

The speech recognition system 100 according to the embodiment may perform at least one of various functions, such as control of an electronic device, schedule management, providing information about weather or traffic conditions, etc., playing music, sending a message, phone call, and navigation.

In addition to the speech recognition system 100 according to the embodiment, various speech recognition systems operated by different providers may exist. However, since not all speech recognition systems perform the same function, at least part of the functions performable by the speech recognition systems may different or overlap between the speech recognition systems.

In addition, there is a case that a function performable by the speech recognition system is not performable for a specific user. For example, even if a certain speech recognition system may perform a function related to storing and retrieving a phone book, the phone-book retrieving function may not be performed by a specific user who has not registered a phone book in the corresponding speech recognition system. As another example, even if a certain speech recognition system may perform schedule management, a specific user who has not registered a schedule in the corresponding speech recognition system may not be provided with information on the schedule.

Accordingly, when the user's intention included in the utterance of the user is identified, the controller 130 may identify whether a function corresponding to the user's intention may be performable by the speech recognition system 100. When the function corresponding to the user's intention is a function not provided by the speech recognition system 100, the controller 130 may identify that the corresponding function is not performable.

In addition, if a function is providable by the speech recognition system 100, but is not providable to the user, for example, if information about the user required to perform the function is insufficient, the controller 130 may identify that the function is not performable.

If a function corresponding to the user's intention is identified as being performable, the controller 130 may perform the corresponding function. For example, when the function corresponding to the user's intention is control of the electronic device, the controller 130 may generate a control signal and transmit the generated control signal to the corresponding electronic device. When the function corresponding to the user's intention is retrieval of specific information, the controller 130 may retrieve the information and transmit the result to a user terminal connected to the speech recognition system 100.

If a function corresponding to the user's intention is identified as not performable, the controller 130 may generate spoken text for requesting at least one other speech recognition system to perform the function corresponding to the user's intention.

To this end, information about the at least one other speech recognition system may be stored in the controller 130. The information about the at least one other speech recognition system may be stored in advance in the controller 130, may be registered and changed by a user, and whenever another speech recognition system performs a function, the information stored in the controller 130 may be updated.

The information about the at least one other speech recognition system may include at least one of a wake-up word for activating the corresponding speech recognition system, a function that may be performable by the corresponding speech recognition system, a history of executing a function in the past, or a connection status with a user terminal (i.e., whether the speech recognition system is connected to a user terminal).

The controller 130 may determine an alternative speech recognition system to perform the function corresponding to the user's intention based on the information about the at least one other speech recognition system. Details of a method of determining an alternative speech recognition system will be described below.

The controller 130 may generate spoken text for requesting the determined speech recognition system to perform a function corresponding to the user's intention. The spoken text may be generated by combining a wakeup word corresponding to the determined speech recognition system and the utterance of the user.

The input user utterance may include a wake-up word and a body. The body refers to a sentence for requesting the execution of a function. The controller 130 may combine the body of the input utterance of the user with the wake-up word corresponding to the determined speech recognition system.

Alternatively, the controller 130 may store sample sentences for each function with respect to the at least one other speech recognition system, and generate the spoken text using the sample sentence matching the user's intention. The sample sentence may be a sentence optimized for the corresponding speech recognition system to identify the user's intention. Accordingly, the controller 130 may generate spoken text by combining a wake-up word corresponding to an other speech recognition system with a sample sentence matching the user's intention, so that recognition performance may be improved.

The utterance generator 140 may include a text to speech (TTS) engine for converting spoken text generated by the controller 130 into an audio signal. In addition, the utterance generator 140 may use a frequency of an inaudible band when converting the spoken text into the audio signal. In the embodiment to be described below, an audio signal of an inaudible frequency band converted from spoken text will be referred to as an inaudible utterance. There is a limit on the frequency band of sound waves that humans may hear. A frequency band of about 18 kHz or higher is known to be undetectable by humans on average. For example, a frequency band of 18 kHz or higher may be defined as an inaudible frequency band. Accordingly, an audio signal using a frequency band of 18 kHz or higher may be included in the audio signal of the inaudible frequency band according to the disclosure.

In addition, when converting spoken text into an audio signal, the utterance generator 140 may consider not only the inaudible frequency band but may also consider a frequency band recognizable by a microphone of a user terminal connected to the alternative speech recognition system. For example, when the frequency band recognizable by the microphone of the user terminal has a range of 10 Hz to 22 kHz, the utterance generator 140 may convert spoken text into an audio signal of a frequency band in a range of 18 kHz to 22 kHz.

However, the above described frequency band is only an example applicable to the speech recognition system 100. The frequency band of an audio signal generated by the utterance generator 140 is not limited thereto as long as it is not detected by a user but detected by a microphone of a user terminal.

As described above, the speech recognition system 100, in response to a function intended by a user not being performable by itself, may automatically request the corresponding function from another speech recognition system, so that the user may receive a desired service without having to make an additional utterance. Therefore, the user may receive a desired service by uttering only a wake-up word of one speech recognition system 100 at any time so that the desired function is requested, without having to identify wake-up words corresponding to various speech recognition systems and functions that may be performable by the speech recognition systems, so that the usability of the speech recognition system 100 may be improved.

In addition, the speech recognition system 100 may generate an utterance for requesting a function from another speech recognition system using an inaudible frequency band that is inaudible to the user, so that a quiet and comfortable use environment may be provided.

The speech processor 120, the controller 130, and the utterance generator 140 of the speech recognition system 100 described above may be implemented by a memory in which a program for performing the above-described operation and an operation to be described below is stored and a processor executing the stored program.

Each of the speech processor 120, the controller 130, and the utterance generator 140 may use a separate memory and processor, or at least part of the speech processor 120, the controller 130, and the utterance generator may share a memory and a processor.

As described above, the speech recognition system 100 may be implemented in the form of a server, and may be embedded in the user terminal according to the memory capacity of the user terminal and the performance of the processor.

However, for the sake of convenience of description, the embodiment to be described below, will be illustrated on a case in which the speech recognition system 100 is implemented as a server and communicates with a user terminal to transmit and receive signals therebetween.

The user terminal may serve as a gateway for connecting the user to the speech recognition system 100. Accordingly, the user terminal may include a microphone for receiving an utterance of the user and a speaker for outputting an inaudible utterance generated by the speech recognition system 100, and may be implemented in various devices, such as a mobile device, a vehicle, an AI speaker, etc. Hereinafter, an embodiment in which the user terminal is a vehicle will be described.

Figure 2:
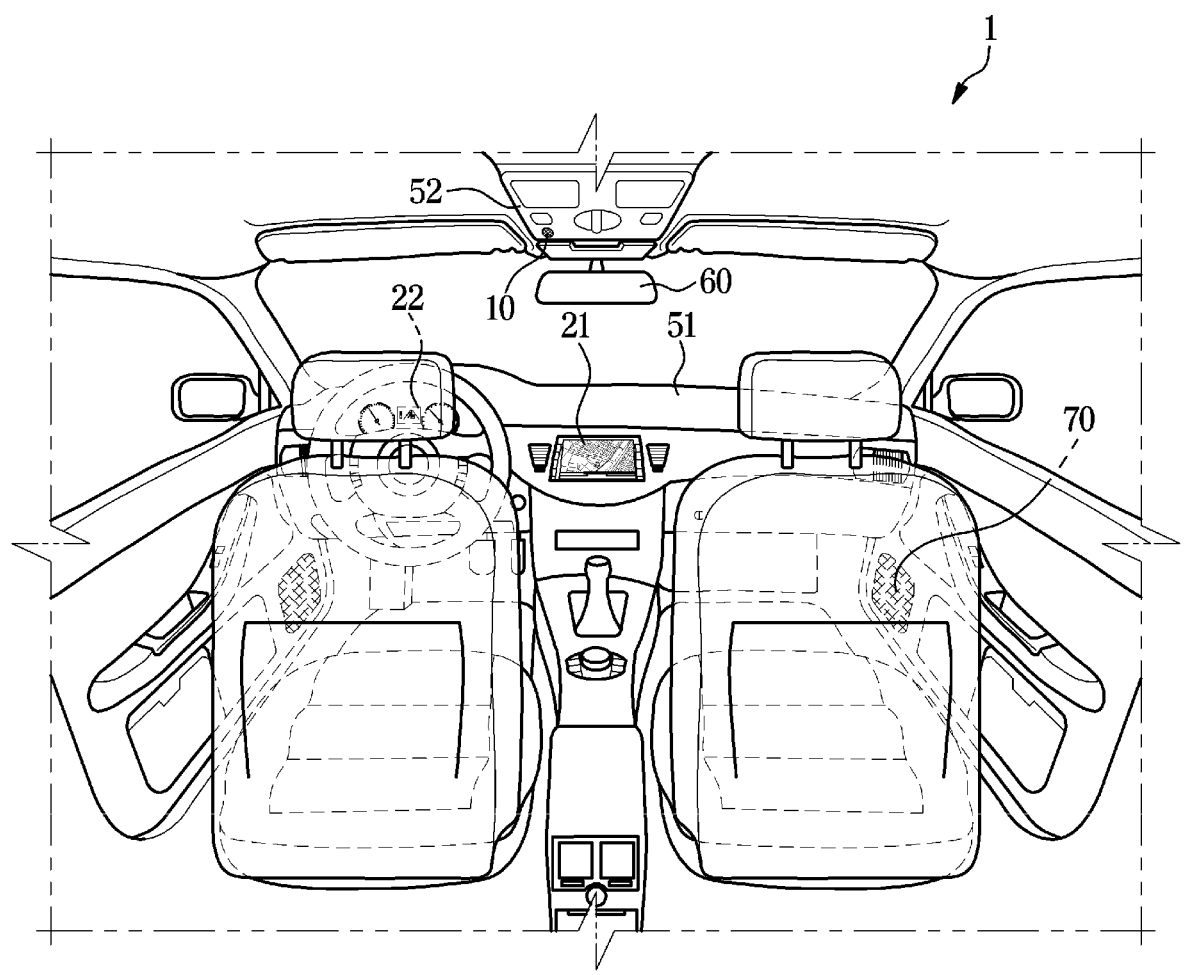
FIG. 2 is a diagram illustrating an internal configuration of a vehicle connected to a speech recognition system according to an embodiment.
Figure 3:
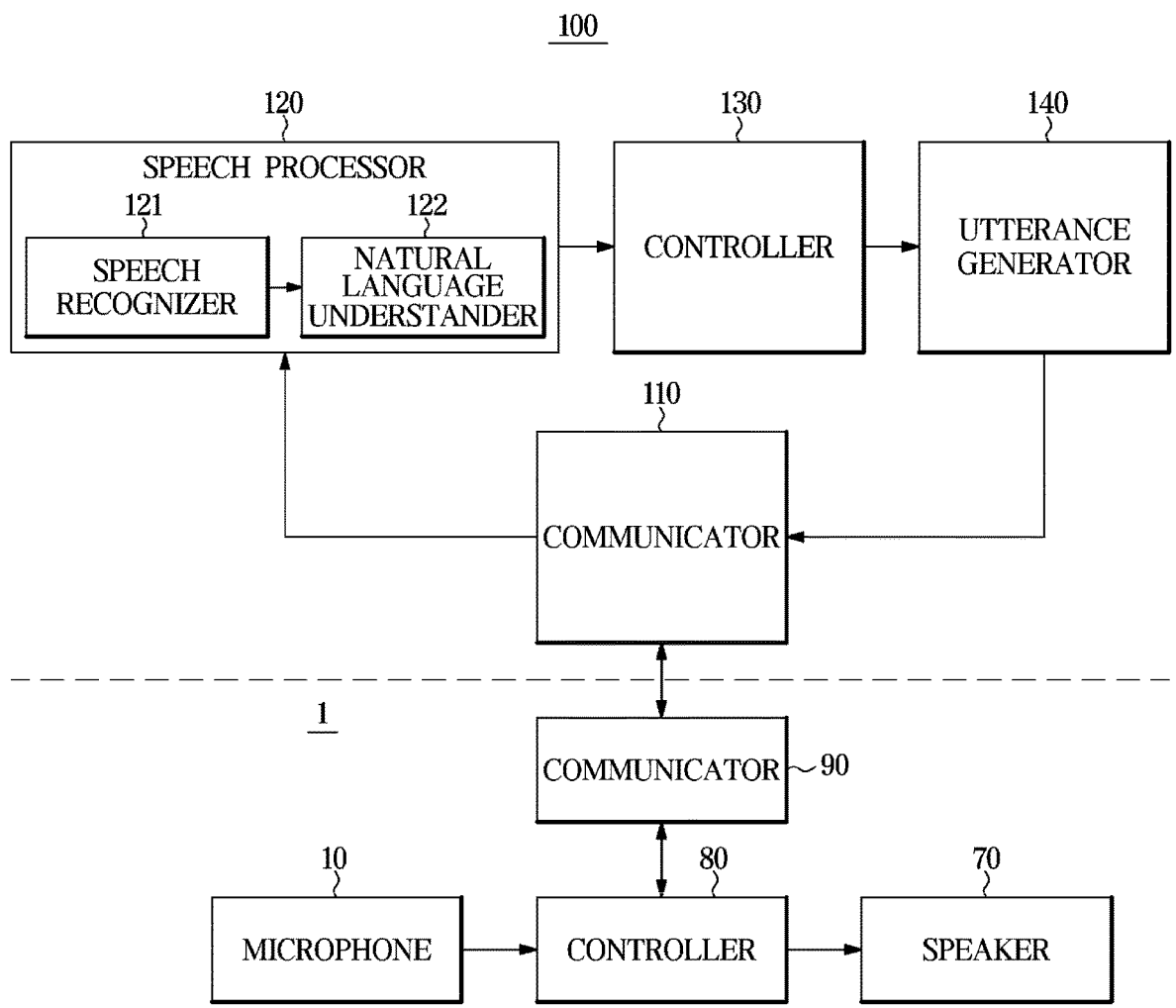
FIG. 3 is a control block diagram illustrating a vehicle connected to a speech recognition system according to an embodiment.
Figure 4:
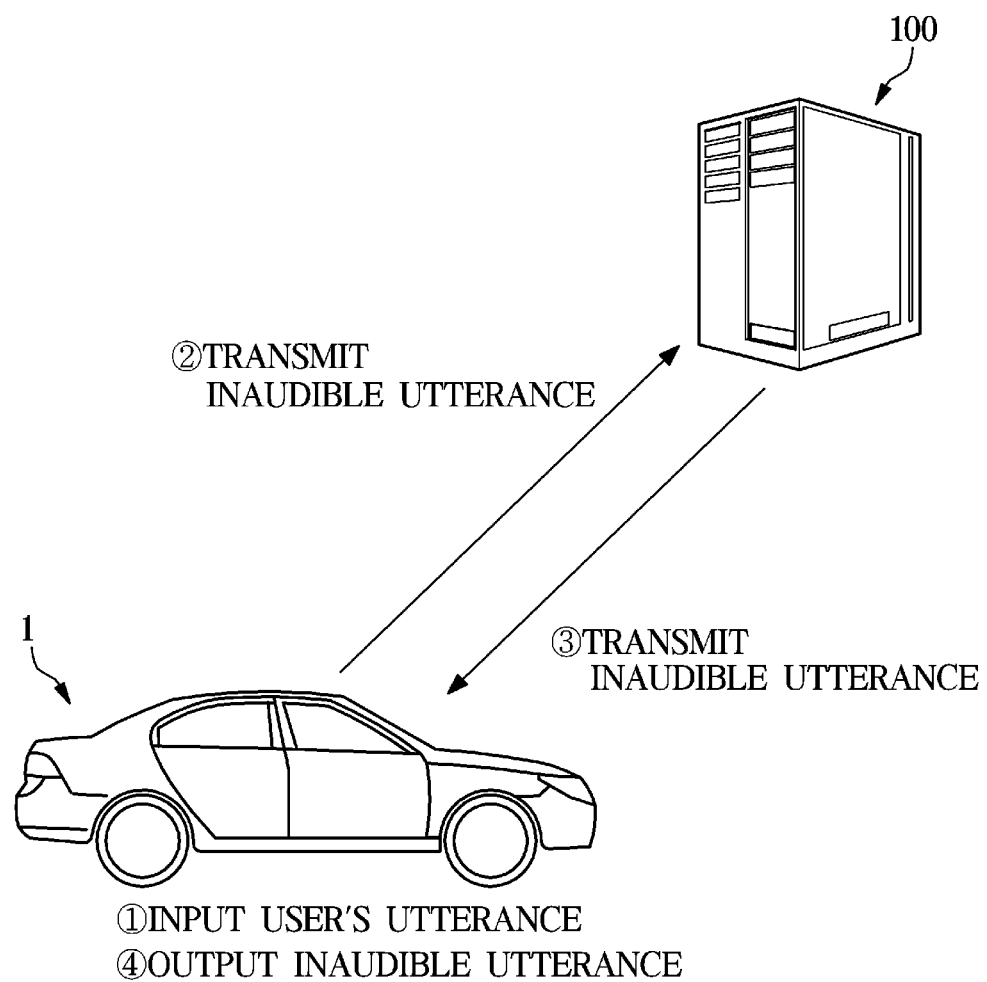
FIG. 4 is a diagram schematically illustrating a signal exchanged between a speech recognition system and a vehicle according to an embodiment.

FIG. 2 is a diagram illustrating an internal configuration of a vehicle connected to a speech recognition system according to an embodiment, FIG. 3 is a control block diagram illustrating a vehicle connected to a speech recognition system according to an embodiment, and FIG. 4 is a diagram schematically illustrating a signal exchanged between a speech recognition system and a vehicle according to an embodiment.

Referring to FIG. 2, an audio-video-navigation (AVN) device may be provided in one area of a dashboard 51 of a vehicle 1, and the AVN device may include an AVN display 21 that displays information required to perform audio, video, or navigation functions.

In addition, a cluster display 22 for displaying the state of the vehicle 1 or travel related information may be provided in one area of the dashboard 51.

According to a function requested by the user, a screen required to perform the requested function may be displayed on the AVN display 21 or the cluster display 22. However, the AVN display 21 and the cluster display 22 are only examples applicable to the vehicle 1, and are not limited on the position as long as it can provide required information to a user including a driver or a passenger.

According a function requested by the user, audio required to perform the requested function may be output through a speaker 70. In addition, the speaker 70 may output an inaudible utterance transmitted from the speech recognition system 100.

A microphone 10 for receiving an utterance of the user may be provided inside the vehicle 1. The microphone 10 may be provided on a headlining 52 of the front of the vehicle, may be provided on a steering wheel, may be provided on a rearview mirror 60, or may be provided on the dashboard 51. The microphone 10 is not limited on the position as long as it can receive an utterance of the user.

Referring to FIGS. 3 and 4 together, when an utterance of the user is input through the microphone 10 inside the vehicle 1 ①, a controller 80 of the vehicle 1 may transmit the utterance of the user to the speech recognition system 100 through a communicator 90 ②.

In order to receive the utterance of the user transmitted from the vehicle 1, the speech recognition system 100 may include a communicator 110. The communicator 90 of the vehicle 1 and the communicator 110 of the speech recognition system 100 may include a wireless communication module to receive and transmit signals with a remote electronic device, such as a 3G communication module, a 4G communication module, a 5G communication module, a wi-fi module, etc.

The communicator 110 of the speech recognition system 100 may transmit the utterance of the user received from the vehicle 1 to the speech processor 120, and the speech processor 120 performs speech recognition and natural language understanding according to the above-described operation to grasp the user's intention and identify a function corresponding to the user's intention.

As described above, the controller 130 may identify whether the function corresponding to the user's intention is performable, and when it is identified that the function corresponding to the user's intention is performable, generate a signal for performing the corresponding function and transmit the signal to the vehicle 1 through the communicator 110.

If it is identified that the function corresponding to the user's intention is not performable, the controller 130 may determine another speech recognition system capable of performing the corresponding function, and generate spoken text for requesting the corresponding function from the determined speech recognition system.

The utterance generator 140 may convert the spoken text into an audio signal of an inaudible frequency band, that is, an inaudible utterance ③, and when the communicator 110 transmits the inaudible utterance to the vehicle 1, that the vehicle 1 may output the inaudible utterance through the speaker 70 ④.

Hereinafter, a process of determining another speech recognition system to which execution of the corresponding function is requested when a function corresponding to the user's intention is not performable by the speech recognition system 100 according to the embodiment will be described in detail.

FIG. 5 is a table showing an example of information about other speech recognition systems stored in a speech recognition system according to an embodiment, and FIGS. 6 to 10 are diagrams illustrating examples of a process of providing a function corresponding to a user's intention by other speech recognition systems.

Referring to the example of FIG. 5, the first speech recognition system, the second speech recognition system, and the third speech recognition system, which are other speech recognition systems, may be registered, and pieces of information about the first speech recognition system, the second speech recognition system, and the third speech recognition system may be stored in a memory. The memory may be a memory used to implement the controller 130 or a memory provided separately from the memory used to implement the controller 130.

As described above, registration of other speech recognition systems may be achieved in advance by a designer, or registration and change of other speech recognition systems may be achieved by a user, and according to execution of functions of other speech recognition systems, related information may be updated.

A wake-up word "○○" for activating the first speech recognition system may be stored, a wake-up word "ΔΔ" for activating the second speech recognition system may be stored, and a wake-up word "□□" for activating the third speech recognition system may be stored. Here, ○, Δ, and □ are only symbols used to indicate an arbitrary wake-up word, and there is no restriction on the number of characters or syllables, a language used, and the meaning of the wake-up word.

As an example, the speech recognition system 100 may sequentially output an inaudible utterance for requesting a function from the first speech recognition system, an inaudible utterance for requesting a function from the second speech recognition system, and an inaudible utterance for requesting a function from the third speech recognition system. The order of utterances may be arbitrarily determined, and if output of an inaudible utterance and then the corresponding function is performed, an additional utterance may not be output, and if the corresponding function is not performed within a predetermined time, an additional utterance may be output.

Alternatively, as in the example of FIG. 5, in addition to the wake-up word, additional information related to at least one among a function performable by each of the other speech recognition systems, a connection status to a user terminal, and a history of executing a function in the past. A speech recognition system connected to the user terminal, that is, the vehicle 1 may be estimated as a speech recognition system currently available in the vehicle 1, and the function execution history may show a speech recognition system preferred or mainly used by the user.

The controller 130 may determine another speech recognition system to perform the function corresponding to the user's intention based on the stored additional information.

According to the example of FIG. 5, it can be seen that the first speech recognition system provides functions of music playback, navigation, phone call, and information search as performable functions, and is currently connected to the vehicle 1 through Bluetooth, and has no history of executing a function. Here, the first speech recognition system may be connectable to a first device, which is a user terminal, and when the first device is connected to the vehicle 1 through Bluetooth, the first speech recognition system may be considered connected to the vehicle 1. The same description may be applied to other speech recognition systems.

The second speech recognition system provides functions of information search, message transmission, phone call, schedule management, and music playback as performable functions, and is not currently connected to the vehicle 1, and has a history of executing information search, schedule management, and message transmission in the past.

The third speech recognition system provides functions of information search, schedule management, and phone call, as performable functions, is currently connected to the vehicle 1 through Bluetooth, and has a history of executing phone call and information search in the past.

The controller 130 may determine another speech recognition system capable of performing a function corresponding to an intention of a user based on the functions performable by each of the speech recognition systems, the connection status to the vehicle 1, and the function execution history.

As an example, the performable function, the connection status to the vehicle 1, and the function execution history may be identified step by step. Specifically, when there are a plurality of other speech recognition systems capable of performing a function corresponding to an intention of a user, a speech recognition system connected to the vehicle 1 may be selected from among the plurality of other speech recognition systems. In addition, when there are a plurality of other speech recognition systems connected to the vehicle 1 or there is not a speech recognition system connected to the vehicle 1, the function execution history may be additionally identified.

As described above, by identifying the connection status to the vehicle 1 or the function execution history, other speech recognition systems that may be generally available in the vehicle 1 are classified. As described above, the connection status to the vehicle 1 or the function execution history may serve as a basis for classifying devices currently existing in the vehicle 1, and in particular, the function execution history may serve as a basis for identifying sufficiency of information for performing the corresponding function.

Figure 6:
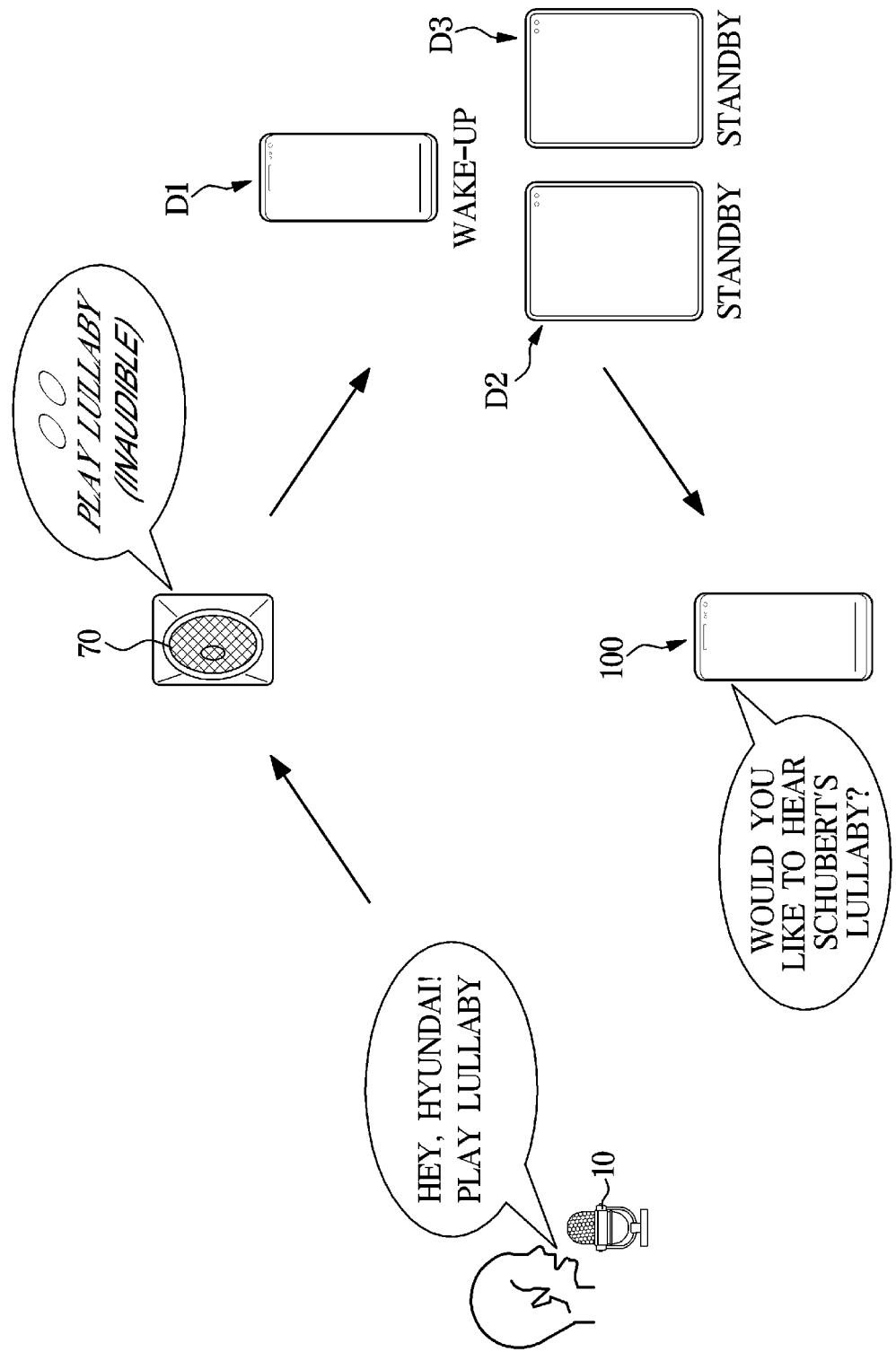
FIGS. 6 to 10 are diagrams illustrating examples of a process of providing a function corresponding to an intention of a user by other speech recognition systems.

Referring to the example of FIG. 6, when a user inputs an utterance, "Hey, Hyundai! Play a lullaby" into the microphone 10 of the vehicle 1, the input utterance may be transmitted to the speech recognition system 100, and the speech processor 120 may identify the user's intention included in the utterance of the user as playback of lullaby.

When the speech recognition system 100 is not able to perform music playback, which is a function corresponding to the user's intention, the controller 130 may determine another speech recognition system capable of performing music playback based on information about the other speech recognition systems. Referring to the example of FIG. 5, it can be seen that the first speech recognition system and the second speech recognition system correspond to speech recognition systems capable of performing music playback among the registered speech recognition systems.

Since there are a plurality of speech recognition systems capable of performing music playback, the controller 130 may perform an additional identification based on the connection status to the vehicle 1. According to the example of FIG. 5 described above, between the first speech recognition system and the second speech recognition system, the first speech recognition system is the speech recognition system connected to the vehicle 1, and thus the controller 130 may determine the first speech recognition system as a speech recognition system to perform the function corresponding to the user's intention, that is, music playback.

The controller 130 may generate spoken text by combining a wakeup word "◯◯" of the first speech recognition system with the utterance of the user "Play a lullaby", and the utterance generator 140 may convert the spoken text into an inaudible utterance and transmit the inaudible utterance to the vehicle 1.

The speaker 70 of the vehicle 1 may output an inaudible utterance "◯◯, Play a lullaby". For example, when there are a first device D1 connected to the first speech recognition system and a second device D2 connected to the second speech recognition system in the vehicle 1, the first device D1 may be woken up by the output inaudible utterance, and the corresponding function may be performed by the first speech recognition system. For example, as shown in FIG. 6, a system utterance for lullaby playback "Would you like to hear Schubert's lullaby?" may be output through the first device D1, and based on a response being input by a user corresponding to the system utterance, the function may be performed.

Figure 7:
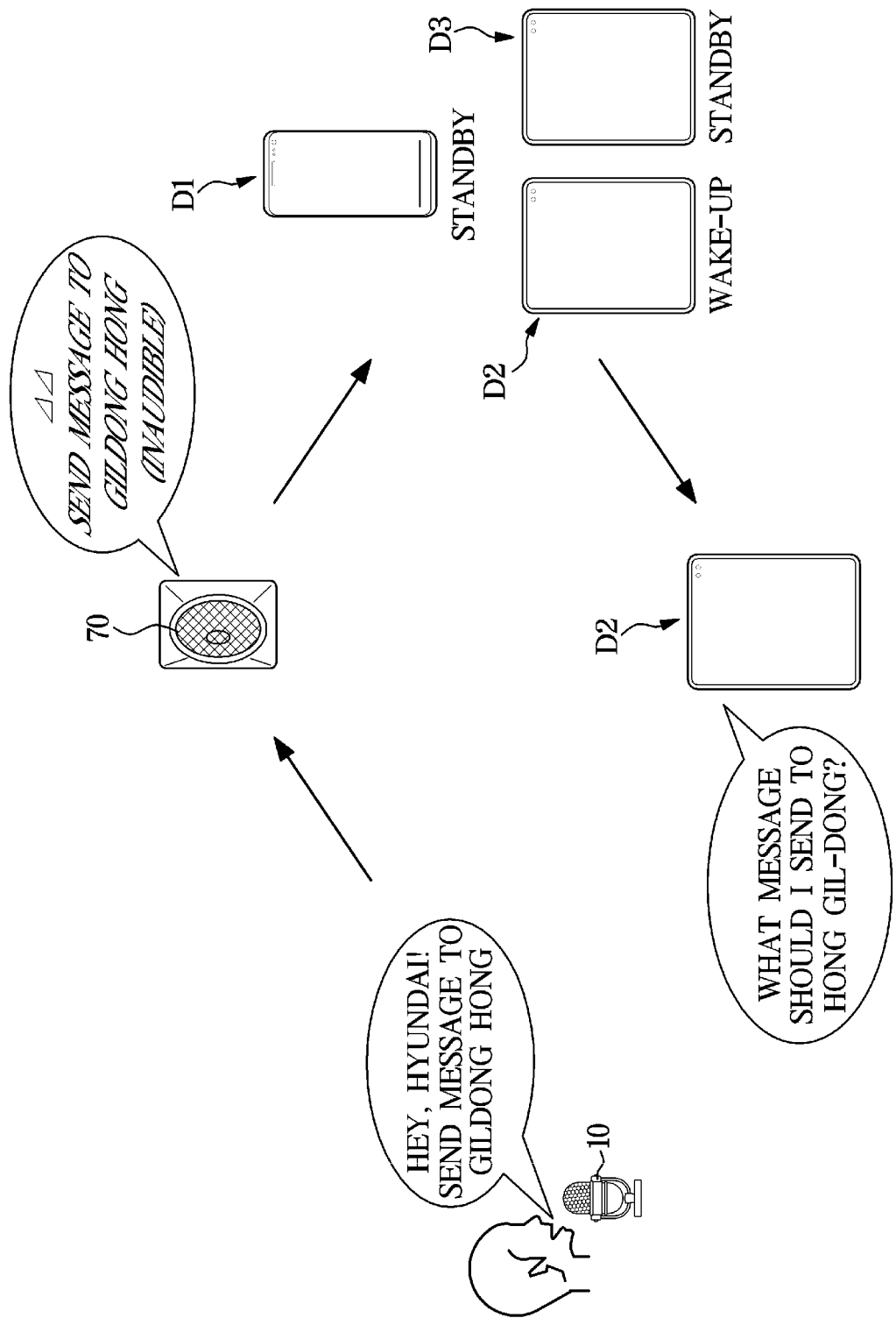

Referring to the example of FIG. 7, when a user inputs an utterance, "Hey, Hyundai! "Send a message to Gildong Hong" into the microphone 10 of the vehicle 1, the input utterance may be transmitted to the speech recognition system 100, and the speech processor 120 may identify the user's intention included in the user utterance as a message sending to Gil-dong Hong.

When the speech recognition system 100 is not able to perform message sending, which is a function corresponding to the user's intention, the controller 130 may determine another speech recognition system capable of performing message sending based on information about the other speech recognition systems. Referring to the example of FIG. 5, it can be seen that the second speech recognition system is a speech recognition system capable of performing message sending among the registered speech recognition systems.

Accordingly, the controller 130 may generate spoken text by combining a wakeup word "ΔΔ" of the second speech recognition system with the utterance of the user "Send a message to Gil-dong Hong", and the utterance generator 140 may convert the spoken text into an inaudible utterance and transmit the inaudible utterance to the vehicle 1.

The speaker 70 of the vehicle 1 may output an inaudible utterance "ΔΔ, Send a message to Gil-dong Hong". For example, when there are a first device D1 connected to the first speech recognition system and a second device D2 connected to the second speech recognition system in the vehicle 1, the second device D2 may be woken up by the output inaudible utterance, and the corresponding function may be performed by the second speech recognition system. For example, as shown in FIG. 7, a system utterance for message sending "What message should I send to Hong Gil-dong?" may be output through the second device D2, and based on a response being input by a user corresponding to the system utterance, the function may be performed Meanwhile, when a response is output from the second device D2, the microphone 10 of the vehicle 1 may receive the response and transmit the response to the speech recognition system 100. Accordingly, the speech recognition system 100 may identify whether the second device D2 exists in the vehicle 1 based on whether a response of the second device D2 is transmitted from the vehicle 1. If a response is not output from the second device D2 within a predetermined time after the output of the inaudible utterance, the controller 130 may identity that the corresponding function is not performable, and output a message indicating that the corresponding function is not performable, through the speaker 70 of the vehicle 1.

Figure 8:
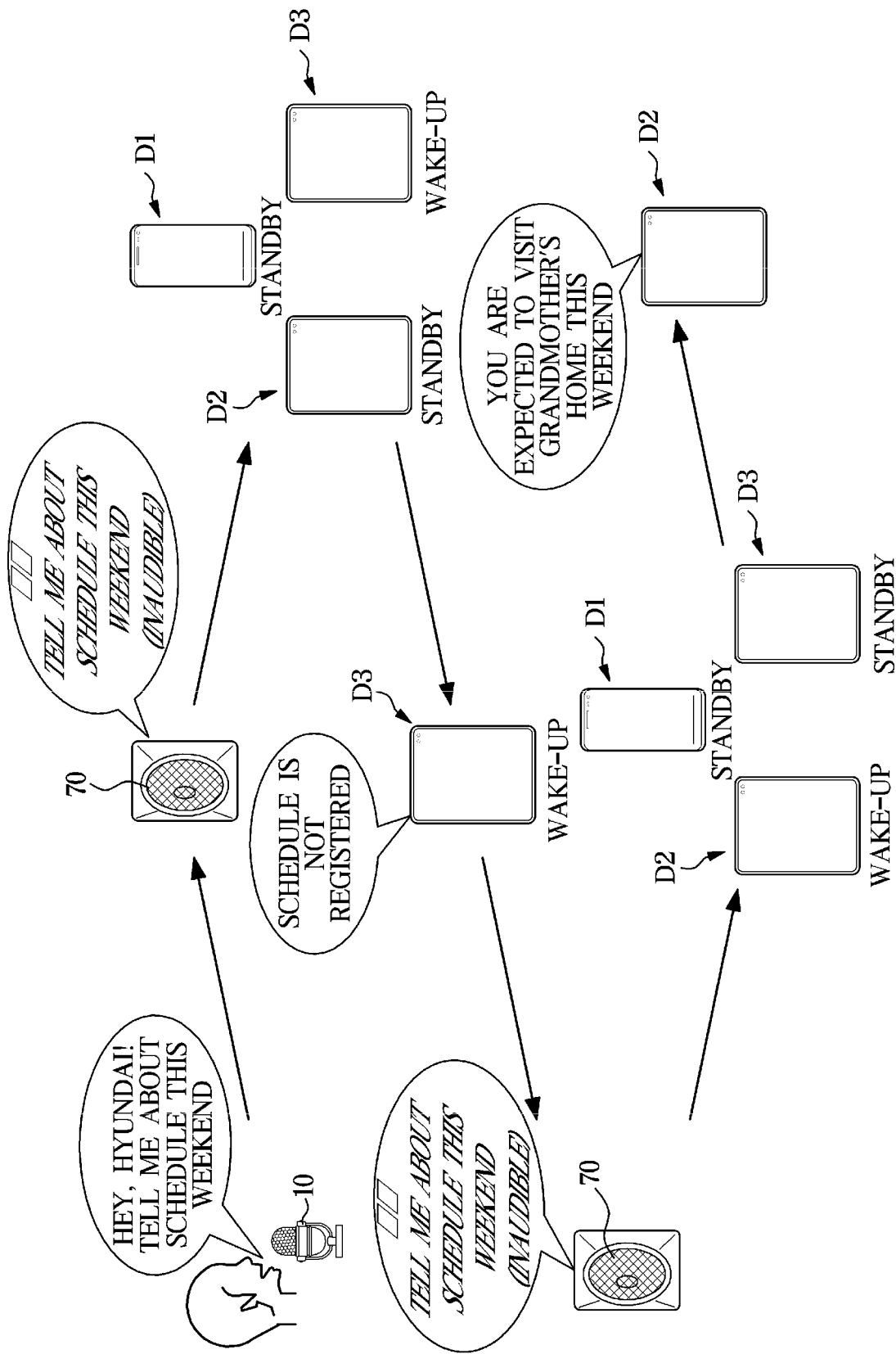

Referring to the example of FIG. 8, when a user inputs an utterance, "Hey, Hyundai! Tell me about the schedule this weekend" into the microphone 10 of the vehicle 1, the input utterance of the user is transmitted to the speech recognition system 100, and the speech processor 120 may identify the user's intention included in the utterance of the user as a weekend schedule search.

When the speech recognition system 100 is not able to perform schedule management, which is a function corresponding to the user's intention, the controller 130 may determine another speech recognition system capable of performing schedule management based on information about the other speech recognition systems. Referring to the example of FIG. 5, it can be seen that the second speech recognition system and the third speech recognition system correspond to speech recognition systems capable of performing schedule management among the registered speech recognition systems.

Since there are a plurality of speech recognition systems capable of performing schedule management, the controller 130 may perform an additional identification based on the connection status to the vehicle 1. According to the example of FIG. 5 described above, between the second speech recognition system and the third speech recognition system, the third speech recognition system is the speech recognition system connected to the vehicle 1, and thus the controller 130 may determine the third speech recognition system as a speech recognition system to perform the function corresponding to the user's intention, that is, schedule management.

The controller 130 may generate spoken text by combining a wakeup word "□□" of the third speech recognition system with the utterance of the user "Tell me about the schedule this weekend", and the utterance generator 140 may convert the spoken text into an inaudible utterance and transmit the inaudible utterance to the vehicle 1.

The speaker 70 of the vehicle 1 may output an inaudible utterance "□□, tell me about the schedule this weekend".

However, in the example of FIG. 8, the schedule of the user is not registered in the third speech recognition system. In this case, even if the third speech recognition system is a system capable of performing schedule management, the function is not performable for the corresponding user. Accordingly, a third device D3 connected to the third speech recognition system may output an utterance, such as "the schedule is not registered" to inform that the function is not performable.

The utterance output from the third device D3 is input to the microphone 10 in the vehicle 1, and the vehicle 1 may transmit the input utterance to the speech recognition system 100. The controller 130 may identify that the third speech recognition system is not able to manage the schedule of the user based on the transmitted utterance, and may determine another speech recognition system as an alternative.

Since the second speech recognition system is included in the speech recognition systems capable of performing the schedule management function, the controller 130 may generate spoken text "ΔΔ, tell me about the schedule this weekend" to request a schedule management from the second speech recognition system. When the utterance generator 140 converts the spoken text into an inaudible utterance, the converted inaudible utterance may be transmitted to the vehicle 1 and output through the speaker 70.

If the second device D2 connected to the second speech recognition system exists in the vehicle 1 and the schedule of the user is registered in the second speech recognition system, a speech guiding the schedule for this weekend may be output through the second device D2 as shown in FIG. 8.

Figure 9:
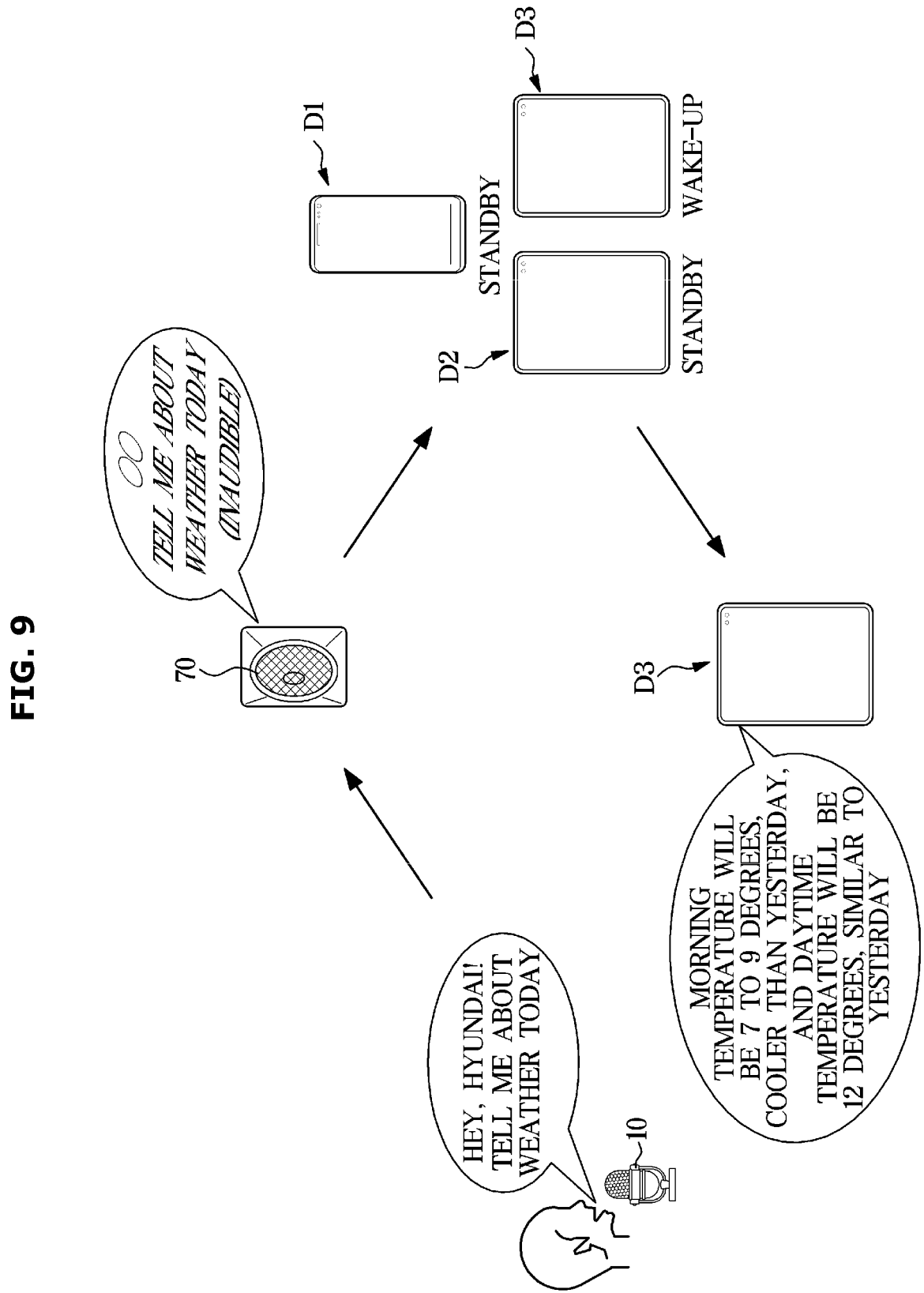

Referring to the example of FIG. 9, when a user inputs an utterance, "Hey, Hyundai! Tell me about the weather today "into the microphone 10 of the vehicle 1, the input utterance is transmitted to the speech recognition system 100, and the speech processor 120 may identify the user's intention included in the utterance of the user as weather search.

When the speech recognition system 100 is not able to perform information search, which is a function corresponding to the user's intention, the controller 130 may determine another speech recognition system capable of performing information search based on information about the other speech recognition systems. Referring to the example of FIG. 5, it can be seen that the first speech recognition system, the second speech recognition system, and the third speech recognition system correspond to speech recognition systems capable of performing information search among the registered speech recognition systems.

Since there are a plurality of speech recognition systems capable of performing information search, the controller 130 may perform an additional identification based on the connection status to the vehicle 1. According to the example of FIG. 5 described above, among the first speech recognition system, the second speech recognition system, and the third speech recognition system, the first speech recognition system and the third speech recognition system correspond to the speech recognition systems connected to the vehicle 1.

Since there are a plurality of speech recognition systems connected to the vehicle, the controller 130 may perform additional determination based on the function execution history. According to the example of FIG. 5 described above, between the first speech recognition system and the third speech recognition system, a speech recognition system having a history of executing information search in the past corresponds to the third speech recognition system. Accordingly, the controller 130 may determine the third speech recognition system as the speech recognition system to perform information search.

The controller 130 may generate spoken text by combining a wakeup word "□□" of the third speech recognition system with the user utterance "Tell me about the weather today", and the utterance generator 140 may convert the spoken text into an inaudible utterance and transmit the inaudible utterance to the vehicle 1.

The speaker 70 of the vehicle 1 may output an inaudible utterance "□□, tell me about the weather today". For example, when the first device D1, the second device D2, and the third device D3 are all exist in the vehicle 1, the third device D3 is woken up by the output inaudible utterance, and the corresponding function may be performed by the third speech recognition system. For example, as shown in FIG. 9, information about today's weather may be output through the third device D3.

Meanwhile, when the volume of a response output from another speech recognition system performing a function corresponding to an intention of a user is significantly low, the speech recognition system 100 may utter the response on behalf of the other speech recognition system.

Figure 10:
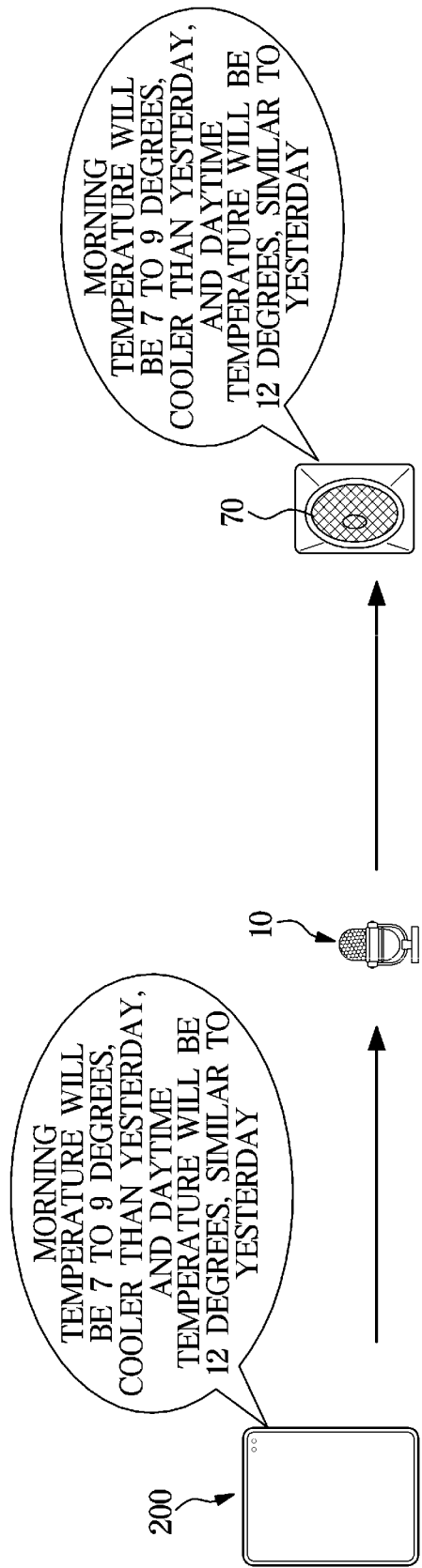

As a specific example, referring to FIG. 10, when the third speech recognition system outputs a response through the third device D3 to provide weather information, the microphone 10 of the vehicle 1 may receive the response and transmit the received response to the speech recognition system 100.

When the volume of the transmitted response is less than a predetermined reference value, the speech generator 140 may generate an utterance of the same response by increasing the volume to a predetermined level or more. In this case, the utterance may be generated in an audible frequency range, for example, a frequency band of 20 Hz or more and less than 18 kHz.

The generated utterance may be transmitted back to the vehicle 1, and the vehicle 1 may output the transmitted utterance through the speaker 70, so that weather information may be provided to the user.

In addition, when an audio signal of an inaudible frequency band is input between speech recognition systems, the corresponding response may also be provided to be output in an inaudible frequency band. In this case, the speech recognition system 100 may convert an inaudible utterance outputted from another speech recognition system that performs a function corresponding to a user's intention into an audio signal of an audible frequency band and output the converted audio signal.

In the above-described embodiment, a case of identifying three conditions to determine an alternative speech recognition system is illustrated, but the determination of the speech recognition system 100 is not limited thereto. For example, only some of the three conditions may be used, and the above-described three conditions are also only an example. In addition, when a plurality of alternative speech recognition systems exist despite the several operations of identification, inaudible utterances for the plurality of alternative speech recognition systems may be sequentially output. In this case, the inaudible utterance of the next order may be output when a response to the inaudible utterance of the previous order is not output.

In addition, when another speech recognition system capable of performing a function corresponding to a user's intention does not exist, an audible utterance indicating that the function is not performable may be output through the speaker 70.

Hereinafter, a method of controlling a speech recognition system according to an embodiment will be described. In implementing the method of controlling the speech recognition system according to the embodiment, the above described speech recognition system 100 may be used. Accordingly, the contents described above with reference to FIGS. 1 to 10 may be equally applied to the method of controlling the speech recognition system unless otherwise mentioned.

Figure 11:
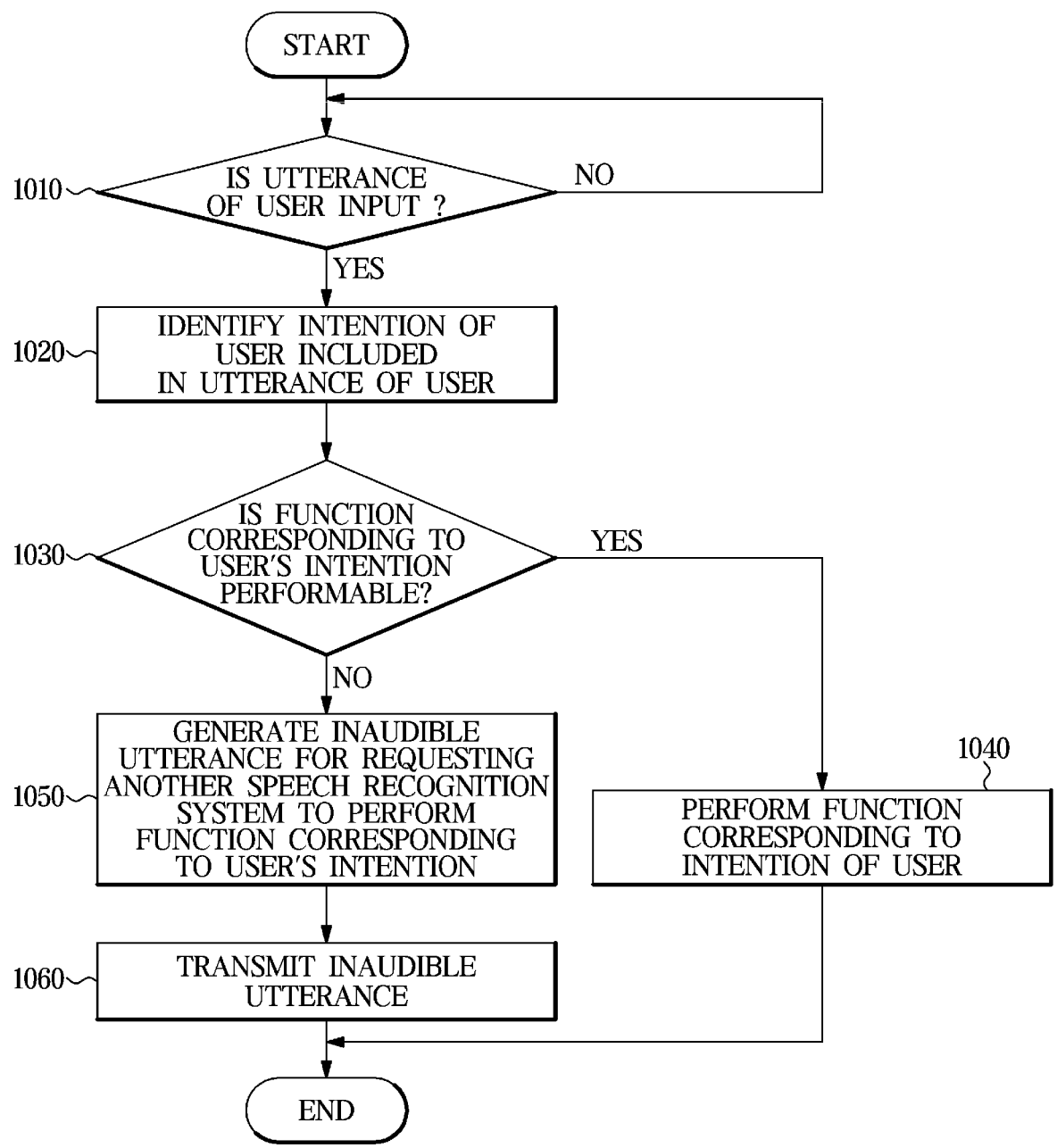
FIG. 11 is a flowchart showing a method of controlling a speech recognition system according to an embodiment.

FIG. 11 is a flowchart showing a method of controlling a speech recognition system according to an embodiment.

Referring to FIG. 11, when an utterance of a user is input to the speech recognition system 100 (YES in operation 1010), the speech processor 120 performs speech recognition and natural language understanding to identify an intention of the user included in the utterance of the user (1020). Since the detailed process of identifying the user's intention is the same as described above in the embodiment of the speech recognition system 100, the descriptions thereof will be omitted herein.

The controller 130 identifies whether a function corresponding to the user's intention is performable by the speech recognition system 100 (1030), and if the function corresponding to the user's intention is performable (YES in operation 1030), the speech recognition system 100 performs the corresponding function (1040).

If the function corresponding to the user's intention is not performable (NO in operation 1030), the speech recognition system 100 generates an inaudible utterance for requesting another speech recognition system to perform the function corresponding to the user's intention (1050).

To this end, the controller 130 may determine another speech recognition system from which execution of the function corresponding to the user's intention is to be requested, based on information about other speech recognition systems, or may sequentially generate inaudible utterances for the plurality of other speech recognition systems that are registered. In the latter case, the utterance order may be arbitrarily determined, and if the corresponding function is performed after output of the inaudible utterance, an additional utterance may not be output, and if the corresponding function is not performed within a predetermined time after output of the inaudible utterance, an additional utterance may be output.

The spoken text may be generated by combining a wakeup word corresponding to another speech recognition system and an utterance of the user, or may be generated using a sample sentence matching the user's intention.

The sample sentence may be a sentence optimized for the corresponding speech recognition system to recognize the user's intention. Accordingly, as the controller 130 generates spoken text by combining a wake-up word corresponding to another speech recognition system with a sample sentence matching the user's intention, recognition performance may be improved.

The utterance generator 140 may convert the spoken text into an inaudible utterance using an audio signal of an inaudible frequency band.

The generated inaudible utterance is transmitted to a user terminal connected to the speech recognition system 100 (1060). The user terminal connected to the speech recognition system 100 may be provided with a microphone 10 and a speaker 70 so that the above-described user utterance is input to the microphone 10, and the inaudible utterance is output through the speaker 70.

The output inaudible utterance is inaudible to the user, but is receivable by a microphone of a device connected to another speech recognition system. Accordingly, the another speech recognition system may be woken up by the output inaudible utterance to perform the requested function.

Figure 12:
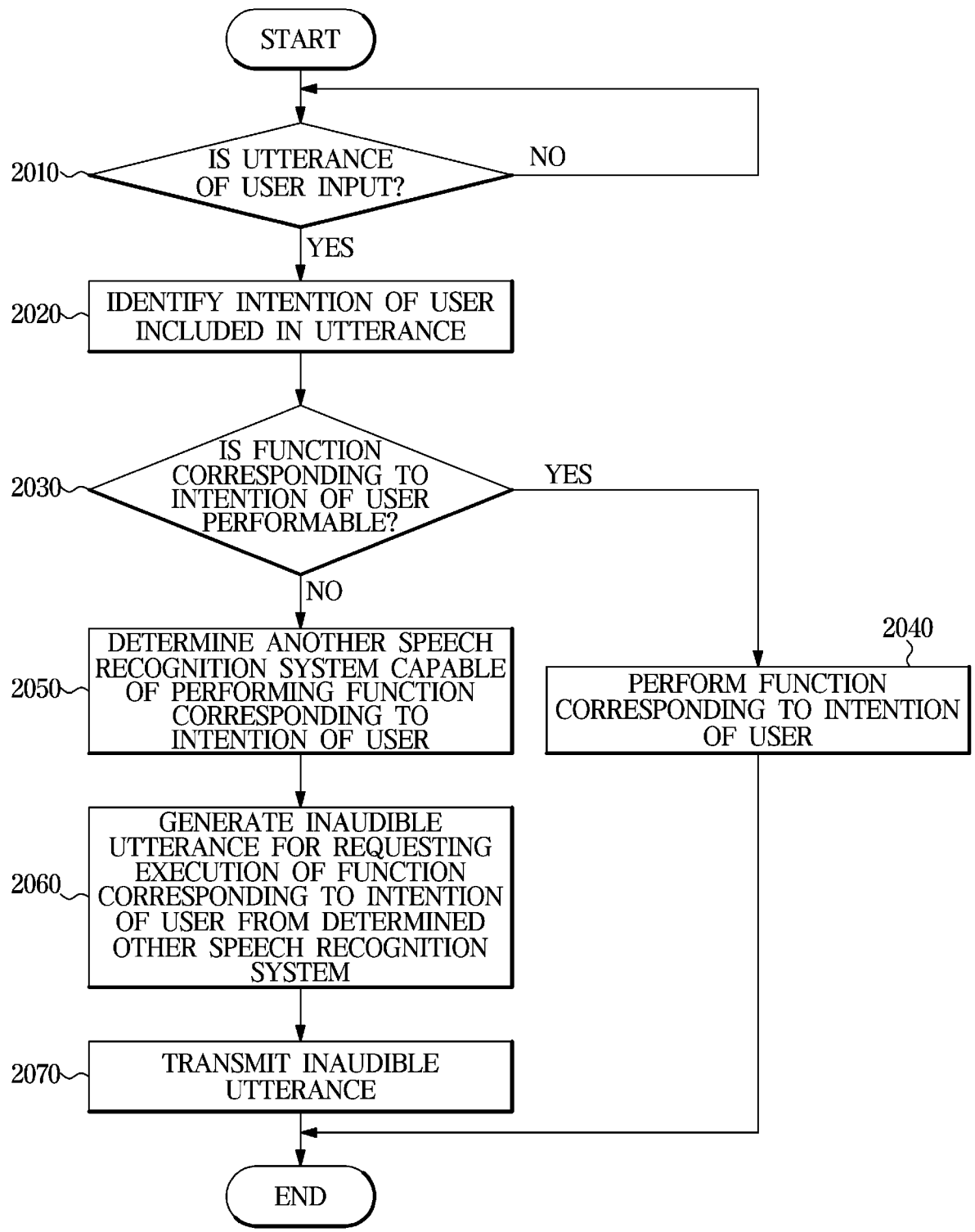
FIG. 12 is another flowchart of a method of controlling a speech recognition system according to an embodiment.

FIG. 12 is another flowchart of a method of controlling a speech recognition system according to an embodiment.

Referring to FIG. 12, when an utterance of a user is input (YES in operation 2010), an intention of the user included in the utterance of the user is identified (2020), and it is identified whether a function corresponding to the user's intention is performable by the speech recognition system 100 (2030).

If the function corresponding to the user's intention is performable (YES in operation 2030), the speech recognition system 100 performs the function (2040), and if the function is not performable (NO in operation 2030), the controller 130 determines another speech recognition system capable of performing the function corresponding to the user's intention (2050).

An inaudible utterance for requesting execution of the function corresponding to the user's intention from the determined other speech recognition system is generated (2060), and the generated inaudible utterance is transmitted to a user terminal connected to the speech recognition system 100 (2070).

FIG. 13 is a flowchart showing a method of controlling a speech recognition system according to an embodiment, which shows a method of determining another speech recognition system to perform a function corresponding to a user's intention. In this example, it is assumed that a user terminal connected to the speech recognition system 100 is the vehicle 1.

In the memory of the speech recognition system 100, information about registered other speech recognition systems may be stored as in the example of FIG. 5. The information about other speech recognition systems may include information related to at least one among: a wakeup word, a performable function, a connection status, and a function execution history, of each of the speech recognition systems.

Registration of other speech recognition systems may be achieved in advance by a designer, or registration and change of other speech recognition systems may be achieved by a user, and according to execution of functions of other speech recognition systems, related information may be updated.

The controller 130 may determine another speech recognition system to perform the function corresponding to the intention of the user on behalf of the speech recognition system 100 based on the stored information about the other speech recognition systems, that is, an alternative speech recognition system. While various conditions may be identified step by step, the following description will be made on one of various applicable examples.

The controller 130 may first determine an alternative speech recognition system based on a list of performable functions (S2051). The present example excludes a case in which there is no other speech recognition system capable of performing a function corresponding to the user's intention.

When the determination of the alternative speech recognition system is completed (YES in operation 2052), an inaudible utterance for requesting the determined alternative speech recognition system to perform the function corresponding to the user's intention may be generated and transmitted according to the above-described process (2060 and 2070).

When the determination of the alternative speech recognition system is not completed (NO in operation 2052), an additional identification may be performed based on other conditions. The incompletion of determining the alternative speech recognition system may be a case in which there are two or more other speech recognition systems capable of performing the function.

For example, an alternative speech recognition system may be determined based on a connection status to the vehicle (2053). That is, a speech recognition system connected to the vehicle among other speech recognition systems capable of performing the function corresponding to the user's intention may be determined as the alternative speech recognition system.

When the determination of the alternative speech recognition system is completed through the additional identification (YES in operation 2054), an inaudible utterance for requesting the determined alternative speech recognition system to perform the function corresponding to the user's intention is generated and transmitted as described above (2060 and 2070).

When the determination of the alternative speech recognition system is still not completed despite the additional identification (NO in operation 2054), an additional identification may be performed based on another condition.

For example, an alternative speech recognition system may be determined based on the function execution history (2055). Specifically, among a plurality of speech recognition systems capable of performing a function corresponding to the user's intention and connected to the vehicle 1, a speech recognition system having a history of executing the same function may be determined as the alternative speech recognition system.

When there are still a plurality of speech recognition systems that satisfy the conditions even after considering the function execution history, inaudible utterances may be sequentially generated and transmitted. For example, inaudible utterances are generated according to an arbitrary order and output through the vehicle 1, and a response is not output from a speech recognition system, which is a target to receive the inaudible utterance, an inaudible utterance for a speech recognition system on the next order may be generated and transmitted.

However, the above-described determination order is only an example applicable to the method of controlling the speech recognition system, and only some of the above-described conditions may be performed, and the order of determination may be changed.

As is apparent from the above, with the speech recognition system and the method of controlling the same according to the embodiment, when a function corresponding to an utterance of a user is not performable by itself, an utterance for requesting the function from another speech recognition system capable of performing the function is generated and output, so that the usability can be improved.

With the speech recognition system and the method of controlling the same according to the embodiment, with regard to generating an utterance for requesting a function from another speech recognition system, an audio signal of an inaudible frequency band is used so that a comfortable use environment can be provided.

Although embodiments of the disclosure have been described with reference to the accompanying drawings, a person having ordinary skilled in the art will appreciate that other specific modifications may be easily made without departing from the technical spirit or essential features of the disclosure. Therefore, the foregoing embodiments should be regarded as illustrative rather than limiting in all aspects.

What is claimed is:

1. A speech recognition system comprising:
a speech processor configured to identify an intention of a user included in an utterance of the user;
a controller configured to identify whether a function corresponding to the intention of the utterance is performable, and if the function corresponding to the intention of the utterance is not performable, generate spoken text for requesting an other speech recognition system to perform the function corresponding to the intention of the user; and
an utterance generator configured to convert the spoken text into a speech signal of an inaudible frequency band.

2. The speech recognition system of claim 1, wherein the controller is configured to register the other speech recognition system in advance, and if the function corresponding to the intention of the user is not performable, generate spoken text for requesting the registered other speech recognition system to perform the function corresponding to the intention of the user.

3. The speech recognition system of claim 1, wherein the controller is configured to determine the other speech recognition system to perform the function corresponding to the intention of the user, and generate the spoken text for requesting the determined other speech recognition system to perform the function corresponding to the intention of the user.

4. The speech recognition system of claim 3, wherein the controller is configured to store information about the function performable by the other speech recognition system in advance, and based on the stored information, determine the other speech recognition system to perform the function corresponding to the intention of the user.

5. The speech recognition system of claim 3, wherein the controller is configured to, if the other speech recognition system has a history of having performed the function corresponding to the intention of the user, determine the other speech recognition system to perform the function corresponding to the intention of the user.

6. The speech recognition system of claim 1, wherein the controller is configured to, if the other speech recognition system connected to a user terminal of the speech recognition system exists, generate the spoken text for requesting the connected other speech recognition system to perform the function corresponding to the intention of the user.

7. The speech recognition system of claim 1, wherein the controller is configured to generate the spoken text by including a wake-up word corresponding to the other speech recognition system.

8. The speech recognition system of claim 7, wherein the controller is configured to generate the spoken text by combining the utterance of the user with the wake-up word.

9. The speech recognition system of claim 8, wherein the controller is configured to store at least a sample sentence for the function of the other speech recognition system, and generate the spoken text based on the intention of the user and the sample sentence.

10. The speech recognition system of claim 1, further comprising a communicator configured to receive the utterance of the user from a user terminal, and transmit the audio signal of the inaudible frequency band to the user terminal.

11. The speech recognition system of claim 10, wherein the controller is configured to, if the registered other speech recognition system is provided in plural, sequentially transmit a plurality of audio signals of inaudible frequency bands respectively corresponding to the plurality of different speech recognition systems, to the user terminal.

12. The speech recognition system of claim 11, wherein the controller is configured to, if a response to the audio signal of the inaudible frequency band outputted through the user terminal is not received, transmit the audio signal of the inaudible frequency band of a next order to the user terminal.

13. A method of controlling a speech recognition system, the method comprising:
identifying an intention of a user included in an utterance of the user;
identifying whether a function corresponding to the intention of the utterance is performable;
generating, if the function corresponding to the intention of the utterance is not performable, spoken text for requesting an other speech recognition system to perform the function corresponding to the intention of the user; and
converting the spoken text into a speech signal of an inaudible frequency band.

14. The method of claim 13, further comprising registering the other speech recognition system in advance, and wherein the generating of the spoken text includes:
if the function corresponding to the intention of the user is not performable, generating the spoken text for requesting the registered other speech recognition system to perform the function corresponding to the intention of the user.

15. The method of claim 13, wherein the generating of the spoken text includes:
determining the other speech recognition system to perform the function corresponding to the intention of the user among a plurality of other speech recognition systems; and
generating the spoken text for requesting the determined other speech recognition system to perform the function corresponding to the intention of the user.

16. The method of claim 15, further comprising:
storing information about the function performable by the other speech recognition system in advance, and
wherein the generating of the spoken text includes, based on the stored information, determining the other speech recognition system to perform the function corresponding to the intention of the user.

17. The method of claim 15, wherein the generating of the spoken text includes:
if the other speech recognition system has a history of having performed the function corresponding to the intention of the user, determining the other speech recognition system to perform the function corresponding to the intention of the user.

18. The method of claim 13, wherein the generating of the spoken text includes:
if an other speech recognition system connected to a user terminal of the speech recognition system exists, generating spoken text for requesting the connected other speech recognition system to perform the function corresponding to the intention of the user.

19. The method of claim 13, wherein the generating of the spoken text includes
generating the spoken text by including a wake-up word corresponding to the other speech recognition system.

* * * * *